F. E. FOWLER, Jr.
WATER COOLED INTERNAL COMBUSTION ENGINE.
APPLICATION FILED FEB. 24, 1913.
1,159,918.
Patented Nov. 9, 1915.
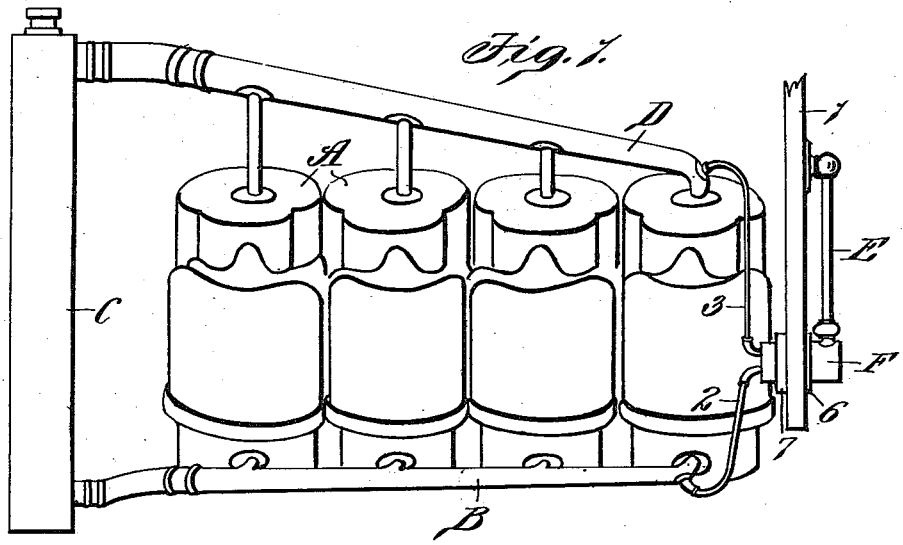
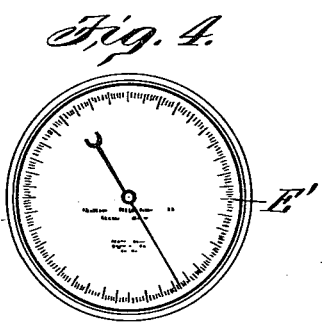
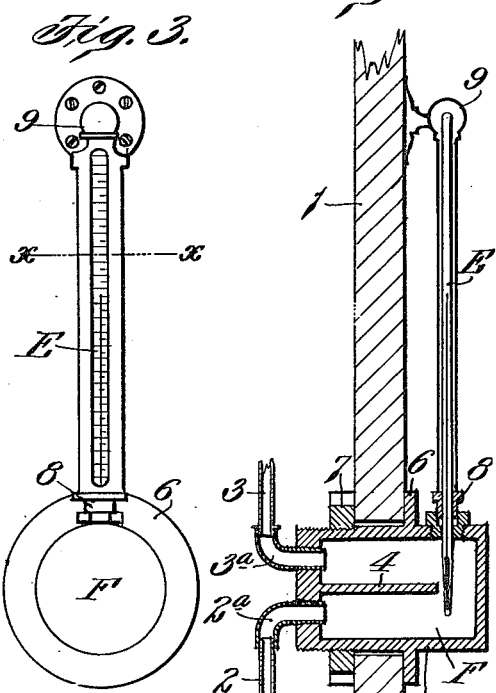
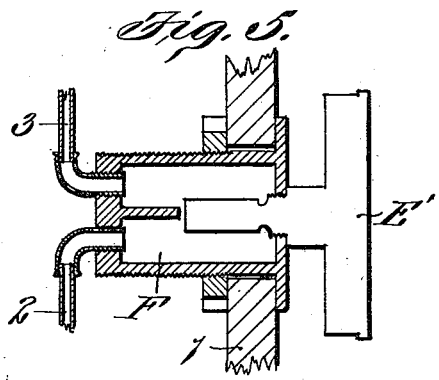
WITNESSES:
INVENTOR,
F. E. Fowler, Jr.
BY
Bakewell & Church
ATTORNEYS.

UNITED STATES PATENT OFFICE.

FRANK E. FOWLER, JR., OF ST. LOUIS, MISSOURI.

WATER-COOLED INTERNAL-COMBUSTION ENGINE.

1,159,918.  Specification of Letters Patent.  Patented Nov. 9, 1915.

Application filed February 24, 1913. Serial No. 750,343.

*To all whom it may concern:*

Be it known that I, FRANK E. FOWLER, Jr., a citizen of the United States, residing at St. Louis, Missouri, have invented a certain new and useful Improvement in Water-Cooled Internal-Combustion Engines, of which the following is a full, clear, and exact description, such as will enable others skilled in the art to which it appertains to make and use the same.

This invention relates to internal combustion engines, and particularly to the water-cooling systems used in such engines for preventing the cylinders from becoming overheated.

One object of my invention is to provide a water-cooled internal combustion engine that comprises a visual means, preferably arranged in close proximity to the operator, for indicating whether or not the water is circulating properly through the cooling system.

Another object is to provide an internal combustion automobile engine that comprises means for showing the approximate temperature of the water in the cooling system after it has passed through the radiator and before it enters the water-jackets of the cylinders, said means consisting of a thermometer that is preferably arranged on the dash of the automobile in plain view of the driver or operator. And still another object is to provide an efficient device of simple construction that can be applied easily to an automobile for indicating the approximate temperature of the water in the cooling system before it enters the cylinders of the engine.

Other objects and desirable features of my invention will be hereinafter pointed out.

Figure 1 is a side elevational view of a four-cylinder internal combustion automobile engine provided with a cooling system embodying my invention; Fig. 2 is an enlarged vertical sectional view illustrating the construction and arrangement of the thermometer and the chamber into which the thermometer projects; Fig. 3 is a front elevational view of the thermometer and the member on the dash that supports the thermometer; Fig. 3ª is a cross sectional view taken on the line *x—x* of Fig. 3; Fig. 4 is a front elevational view of a mechanical thermometer which may be used instead of the mercury thermometer shown in Fig. 2; and Fig. 5 is a vertical sectional view showing said mechanical thermometer mounted in operative position, the thermometer being shown in side elevation.

Referring to Figs. 1 to 3 of the drawings which show my invention embodied in an automobile internal combustion engine, A designates the cylinders of the engine which are provided with water-jackets of any preferred type or design, B designates the supply-pipe of the cooling system that leads from the lower end of the radiator C to the lower ends of the water-jackets of the cylinders, and D designates the return pipe of the cooling system that leads from the upper ends of the water-jackets of the cylinders to the upper end of the radiator, the water being cooled in its passage through the radiator so that it enters the water-jackets at a much lower temperature than it leaves said water-jackets.

In order that the operator will know the approximate temperature of the water before it enters the water-jackets of the cylinders I have provided the cooling system of the engine with a thermometer E arranged in such a manner that it will indicate the temperature of the water in the supply-pipe B that leads from the lower end of the radiator. Any suitable type of thermometer may be used and it can be arranged in various ways. The thermometer shown in Figs. 1 to 3 is a mercury thermometer and it is arranged on the dash 1 of the automobile so that it will always be in plain view of the driver or operator. The lower end of the thermometer projects into a chamber F that is connected by means of a conduit 2 with the supply-pipe B of the cooling system and by means of a conduit 3 with the return-pipe D of the cooling system, thereby causing the cooled water to circulate from the supply-pipe B through the chamber F and then up to the return-pipe D. A horizontally disposed baffle 4 or other suitable deflecting member is preferably arranged inside of the chamber F, as shown in Fig. 2, so as to cause the water to circulate around the lower end of the thermometer E, and while I have herein shown the conduits 2 and 3 tapped into the supply and return pipes B and D, respectively, at points adjacent the fourth cylinder of the engine, I do not wish it to be understood that my invention is limited to such a construction for it is immaterial so far as my broad idea is concerned how the cooled water is supplied to the chamber F and conducted out of same. In fact, the conduits 2 and 3 could lead directly to the bottom and top of the radiator without departing from the spirit of my invention which, broadly stated, consists in means for causing the cooled water that has passed through the radiator to act upon a temperature-indicating device that will show the approximate temperature of the water before it is applied to the cylinders.

A hollow member 5, preferably a cylindrical-shaped casting that is closed at both ends, is used to form the chamber F and said member is arranged horizontally in the dash 1, as shown in Fig. 2, said member being provided with an integral flange 6 that bears against one side of the dash and a removable clamping device 7 that is screwed onto said member and which bears against the other side of the dash. Elbows 2$^a$ and 3$^a$ which are tapped into the rear end wall of the member 5, form a convenient means for connecting the conduits 2 and 3 to said member, and, if desired, the conduit 2 can be provided with a cover of insulating material so as to prevent the heat from radiating from same. An ordinary stuffing-box 8 which is mounted on the upper side of the member 5 at a point in front of the dash, serves to hold the thermometer E in operative position, and, if desired, a protecting housing 9 provided with a vertically-disposed slot or opening, as shown in Figs. 3 and 3$^a$, can be secured to the front of the dash so as to protect the thermometer from injury. A mechanical thermometer E' may be used instead of a mercury thermometer, the mechanical thermometer shown in Figs. 4 and 5 being mounted in the front wall of the hollow member 5 so that a portion of same will project into the chamber F through which the cooled water from the radiator flows.

One desirable feature of an internal combustion engine of the construction above-described is that the operator always knows whether or not the water is circulating freely through the cooling system. If the thermometer shows that the water in the chamber F is boiling or near boiling point, the operator knows that there is some obstruction in the system which prevents the water from circulating freely for when the water circulates properly it will always be below boiling point after it has passed through the radiator. Therefore, my invention tends to reduce the liability of the operator running the engine long enough after the circulating system has become clogged to cause the engine to overheat for a careful operator who watches the thermometer can tell immediately whether or not the cooling system is performing its function properly.

Another desirable feature of my invention is that it warns the operator when more anti-freezing compound should be added to the water in the cooling system so as to prevent the water from freezing. The anti-freezing compound that is generally used in automobile engines contains a large percentage of alcohol, and in view of the fact that alcohol evaporates quickly, the driver never knows whether or not there is sufficient anti-freezing compound in the water to prevent the water from freezing. My invention overcomes this objectionable feature for the thermometer always shows the temperature of the cooled water in the cooling system. Consequently, if the thermometer shows that the temperature of the water is near freezing-point the operator can add more anti-freezing solution to the water.

My invention can be embodied easily in any type of water-cooled automobile engine without removing the engine from the automobile, and as it comprises only a few parts of simple construction it can be manufactured and marketed at a low cost.

Having thus described my invention, what I claim as new and desire to secure by Letters Patent is:

In a water-cooled engine, a closed chamber provided with an inlet and an outlet, a supply-pipe and a return-pipe coöperating with said inlet and outlet, respectively, so that the cooled water will flow through said chamber, a thermometer projecting into said chamber, and a baffle in said chamber arranged between the inlet and outlet so as to cause the water to circulate around the thermometer.

In testimony whereof I hereunto affix my signature in the presence of two witnesses, this twentieth day of February 1913.

FRANK E. FOWLER, Jr.

Witnesses:
  WELLS L. CHURCH,
  GEORGE BAKEWELL.